United States Patent [19]

Morse

[11] Patent Number: 4,776,416
[45] Date of Patent: Oct. 11, 1988

[54] CONTROL ASSEMBLY FOR POWERED WHEELCHAIR

[76] Inventor: John F. Morse, 1699 Hines Hill Rd., Hudson, Ohio 44236

[21] Appl. No.: 132,320

[22] Filed: Dec. 14, 1987

[51] Int. Cl.⁴ ............................................. B62D 61/08
[52] U.S. Cl. ...................... 180/65.1; 74/98; 74/473 R; 74/485; 116/DIG. 20; 180/216; 180/315; 180/907
[58] Field of Search ............... 180/13, 65.1, 211, 213, 180/214, 216, 315, 907, 322; 74/566, 551.5, 551.8, 563, 551.1, 98, 473 R, 484 R, 485, 488; 116/DIG. 2, 313; 200/337

[56] References Cited

U.S. PATENT DOCUMENTS

| | | | |
|---|---|---|---|
| 698,137 | 4/1902 | Porter | 74/551.5 |
| 1,519,732 | 12/1924 | Kimmerle | 74/485 |
| 2,321,528 | 6/1943 | Sherer | 74/566 |
| 2,701,656 | 2/1955 | French | 74/98 |
| 3,300,612 | 1/1967 | Quayle | 180/65.1 |
| 4,570,739 | 2/1986 | Kramer | 180/65.1 |
| 4,682,509 | 7/1987 | Takamiya et al. | 74/551.5 |
| 4,729,447 | 3/1988 | Morse | 180/65.1 |

FOREIGN PATENT DOCUMENTS 2548997  1/1985  France .......................... 180/907

OTHER PUBLICATIONS

Advertisement Brochure: "The 2000FS", Fortress Scientific, 61 Main Street, Buffalo, N.Y. 14204.

Primary Examiner—John J. Love
Assistant Examiner—Brian L. Johnson
Attorney, Agent, or Firm—Renner, Kenner, Greive, Bobak, Taylor & Weber

[57] ABSTRACT

A control assembly for an electric powered wheelchair having a forward steering column (13) on which a handle bar (14) and a control lever (119) are mounted, said control lever adapted when pressed forward to move the chair forwardly, and when pressed rearward to move the chair rearwardly, a second control lever (120) mounted on an idler shaft (130) and operatively engaged with said first control lever (119) whereby pressing either lever forward or rearward will cause the chair to move in the desired direction.

6 Claims, 3 Drawing Sheets

CONTROL ASSEMBLY FOR POWERED WHEELCHAIR

TECHNICAL FIELD

This invention relates generally to control assemblies for electric powered wheelchairs, and more particularly to control assemblies for wheelchairs having hand control levers forwardly of the chair seat.

BACKGROUND OF THE INVENTION

A three-wheel electric powered chair in public use in the United States is manufactured by Fortress Scientific of Hayes Road, Southall, Middlesex, England UB2512. This chain has steering handle bars forward of the chair seat and forward and reverse control lever arms mounted behind the handle bars for actuation by the thumbs of the driver having his hands on the handle bars.

In this prior control assembly which is shown in FIG. 2 of the drawings herein, the driver can press the right control lever arm 19 forward to proceed forwardly, and press the left control lever arm 20 forward to proceed rearwardly. The driver is usually an elderly or handicapped person, or both, and as such may be under physical or mental stress, so that often he does not act quickly or remember correctly which lever arm to press in order to go forwardly or rearwardly. Hence, he may press the wrong lever arm to proceed in the desired direction and receive a severe shock or jolt and consequent injury when the chair moves in the opposite direction.

DISCLOSURE OF THE INVENTION

The present invention provides improved mechanism for enabling the driver to press either lever arm forward to proceed forwardly and either lever arm rearward to proceed rearwardly, an operation which is both logical and instinctive, and does not involve the likelihood of pressing either lever arm in the wrong direction to move the chair in the desired direction.

It is an object of the present invention to provide an improved control lever assembly for an electric powered wheelchair, comprising right and left control lever arms which are operatively connected so that pressing either arm forwardly will cause the chair to move forwardly, and pressing either arm rearwardly will cause the chair to move rearwardly.

Another object is to provide a simple, compact and inexpensive control assembly which accomplishes the foregoing objective.

PREFERRED MODE FOR CARRYING OUT THE INVENTION

Figure 1:
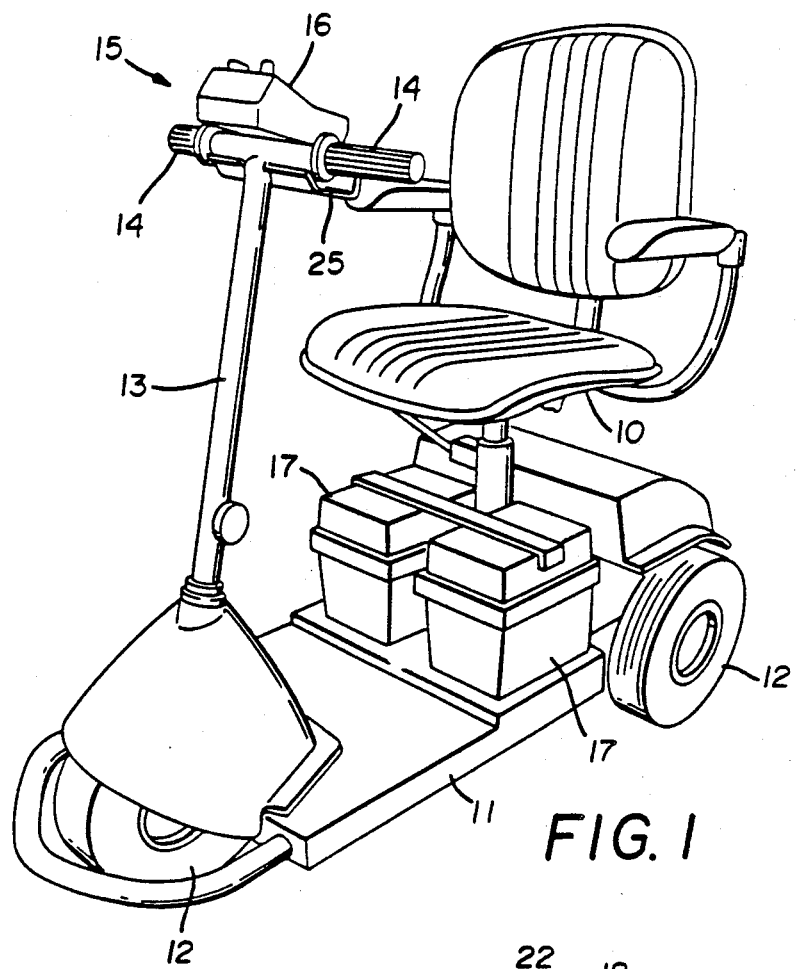
FIG. 1 is a perspective view of a three-wheeled electric powered wheelchair embodying the invention.
Figure 2:
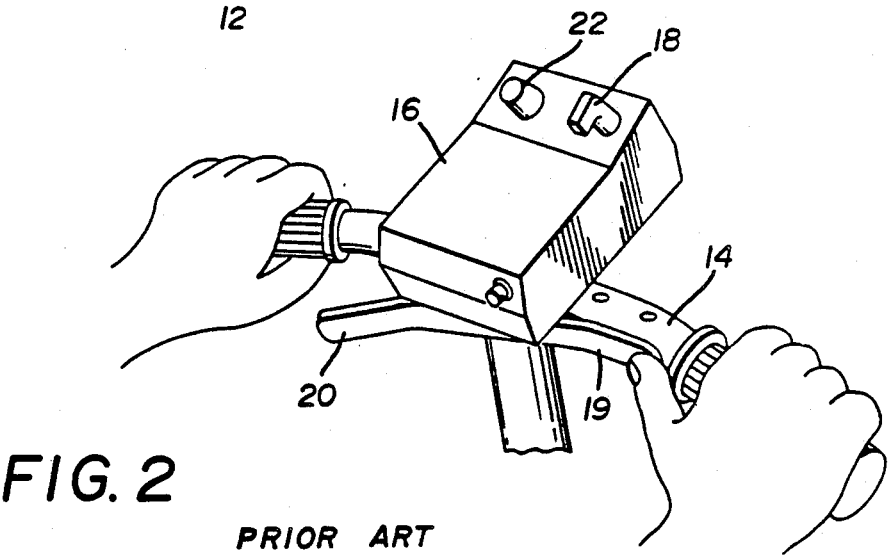
FIG. 2 is an enlarged partial perspective view showing the control assembly of a prior art electric powered chair.
Figure 3:
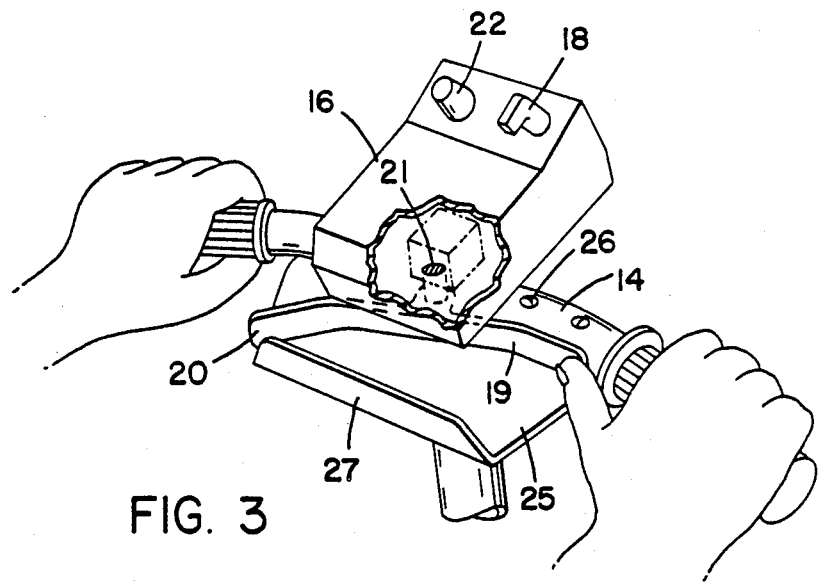
FIG. 3 is a similar view showing a safeguard associated with the control assembly to prevent accidental actuation of the control lever, which safeguard is the invention disclosed and claimed in my U.S. Pat. No. 4,729,447.

Referring to FIGS. 1-3, the electric powered wheelchair includes a seat 10 and a floor board 11 supported on three wheels 12. A forward steering column 13 is operatively connected to the front wheel and actuated by handle bar 14. The control assembly indicated generally at 15 embodies an electric switch box 16 mounted on top of the steering column 13, and it is connected to the batteries 17 through a main switch 18. The control assembly 15 includes a control lever having two arms 19 and 20 and it is pivoted at 21 in the underside of the switch box 16 and is electrically connected in the switch box to the rotatable speed button 22.

In the normal operation of the control assembly shown in FIGS. 2 and 3, with the occupant seated in the chair, the main switch is turned on and the occupant turns the speed control button to indicate the speed desired. He then places his hands on the handle bar 14 with his thumbs behind the lever arms 19 and 20. If he desires to go forward he presses the right hand lever arm 19 forwardly as shown in FIGS. 2 and 3, and if he desires to go rearward he presses the left hand lever forwardly. Obviously, pressing the right arm 19 forwardly causes the left arm 20 to move rearwardly, and pressing the left arm 19 forwardly causes the right arm to move rearwardly. The pivot shaft 21 of lever 19, 20 is automatically controlled within the switch box to return the lever arms to neutral inoperative position when the pressure on both lever arms is relieved, but the pivot shaft is still electrically connected to the batteries 17 unless and until the main switch 18 is turned off.

Figure 4:
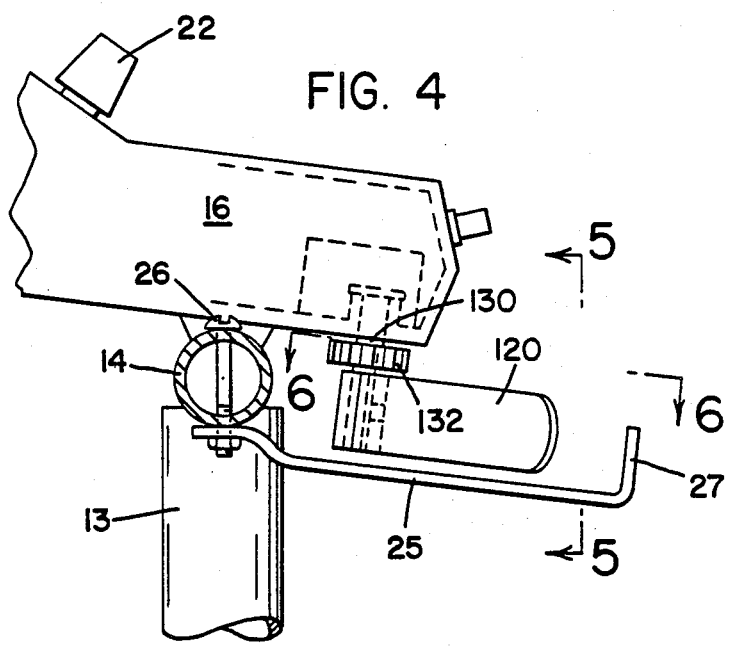
FIG. 4 is a side elevational view, partly broken away and in section, showing the control assembly of the present invention.

Referring to FIG. 3, the safeguard to prevent accidental actuation of the control lever is a platform 25 which prevents contact of the lever arms 19 and 20 by the occupant's body when rising to dismount which would cause motion of the chair if the main switch has not be turned off. Preferably, the platform 25 has an upturned rear flange 27, as shown in FIG. 4, and the platform is mounted at its front end on the handle bar 14 by bolts 26 This invention is fully covered in my U.S. Pat. No. 4,729,447 and forms no part per se of the present invention.

Figure 5:
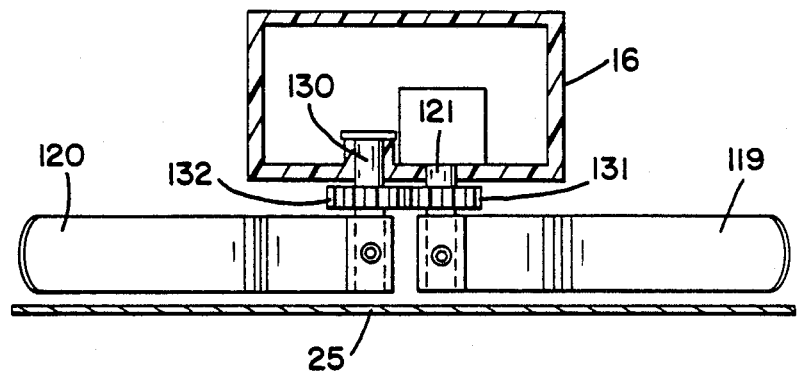
FIG. 5 is a sectional view, substantially on line 5—5 of FIG. 4.
Figure 6:
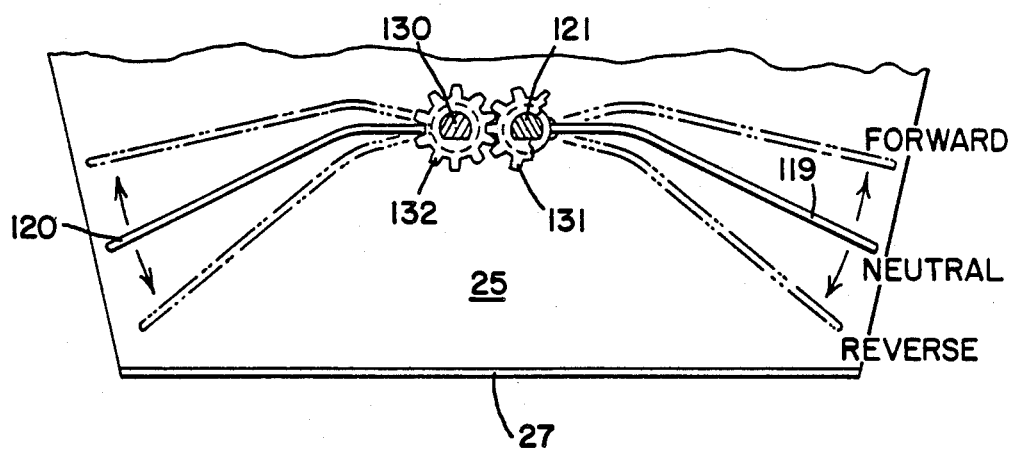
FIG. 6 is a plan sectional view on line 6—6 of FIG. 4, showing neutral, forward and reverse positions of the control levers.

Referring to FIGS. 4-6, the present invention comprises providing separate right and left lever arms, one arm secured on the control shaft and the other arm secured on an idler shaft, and operatively interengaging the shafts so that rotary movement of one shaft will cause the other shaft to rotate in the same direction. Accordingly, right lever arm 119 is secured on control shaft 121, and left lever arm 120 is secured on an idler shaft 130 journaled in the underside of switch box 16 to the left of shaft 121. The means for transferring motion from one shaft to the other is preferably identical meshing spur gears 131 and 132 secured on the shafts 121 and 130 respectively, so that rotation of either shaft by moving its lever arm in one direction will cause the other lever arm to move in the same direction.

In FIG. 6, the right and left arms 119 and 120 are shown in full lines in the neutral or inoperative position and the forward and reverse positions of the arms are shown in dot-dash lines.

The invention provides for safe operation of the wheelchair, especially by elderly or handicapped persons, because forward motion of the chair is obtained by the natural and instinctive action of pressing forward with either hand, and reverse or rearward motion of the chair is obtained by pressing rearwardly on either lever, against the natural and instinctive action to take. The elderly, handicapped or infirm person does not have to remember or think about which lever to press or in which direction to press it. Consequently, the danger of the occupant pushing the wrong lever arm and receiving a shock or jolt by suddenly moving in the direction opposite to the expected is eliminated. Obviously, the improved control assembly is equally adapted for operation by a right handed or left handed person.

I claim:

1. In combination with an electric powered wheelchair having a steering column forward of the chair seat, a handle bar having handles on its ends mounted on the top of said column and extending substantially crosswise of the longitudinal axis of the wheelchair, a switch box mounted at the top of said steering column, a switch control shaft pivoted on the underside of said box, a control lever arm secured on said shaft extending behind one of said handles, said control lever arm adapted when pressed forwardly to move the wheelchair forwardly and when pressed rearwardly to move the wheelchair rearwardly, the improvement comprising a motion transfer member keyed on said control shaft, an idler shaft pivoted on the underside of said switch box, a second control lever arm secured on said idler shaft extending behind the other of said handles and a second motion transfer member keyed on said idler shaft and operatively engaging said first motion transfer member, whereby pressing forward on either lever arm will move said wheelchair forwardly and pressing rearward on either lever arm will move said wheelchair rearwardly.

2. The combination of claim 1, wherein said first and second motion transfer member are intermeshing gears.

3. The combination of claim 2, wherein a fail-safe guard is mounted on said handle bar and is spaced behind the control lever arms to prevent accidental contact with the body of the occupant of the chair when rising to dismount.

4. The combination of claim 3, wherein said fail-safe guard has a rear edge flange for contact with the body of the chair occupant.

5. The combination of claim 4, wherein said fail-safe guard has a platform underlying said lever arms to serve as a guide for the entrance of the occupant's thumbs into actuating position adjacent said lever arms.

6. The combination of claim 5, wherein said rear edge flange is spaced behind said lever arms a distance at least equal to the thickness of an occupant's thumbs when the lever arms are in neutral position.

* * * * *